United States Patent [19]

Doerr et al.

[11] Patent Number: 5,578,712
[45] Date of Patent: Nov. 26, 1996

[54] FIBRE-REACTIVE MONOAZONAPHTHYL DYESTUFFS

[75] Inventors: Markus Doerr, Staufen, Germany; Roland Wald, Huningue, France

[73] Assignee: Sandoz Ltd., Basel, Switzerland

[21] Appl. No.: 431,650

[22] Filed: May 2, 1995

Related U.S. Application Data

[63] Continuation of Ser. No. 106,002, Aug. 13, 1993, abandoned.

[30] Foreign Application Priority Data

Aug. 14, 1992 [DE] Germany ............ 42 26 919.9
Jan. 25, 1993 [DE] Germany ............ 43 01 883.1

[51] Int. Cl.⁶ ............ C09B 62/245; C09B 62/085; C09B 62/24; D06P 1/382
[52] U.S. Cl. ............ 534/634; 534/632; 534/635; 534/637; 534/638
[58] Field of Search ............ 334/632, 634, 334/635, 637, 638

[56] References Cited

U.S. PATENT DOCUMENTS

| | | | |
|---|---|---|---|
| 3,208,990 | 9/1965 | Benz et al. | 534/627 |
| 3,490,859 | 1/1970 | Soiron et al. | 534/627 X |
| 3,669,951 | 6/1972 | Bien et al. | 534/627 |
| 4,007,164 | 2/1977 | Bien et al | 534/638 X |
| 5,227,477 | 7/1973 | Auerbach et al. | 534/634 |
| 5,268,458 | 12/1993 | Springer et al. | 534/634 X |
| 5,340,928 | 8/1994 | Hoppe et al. | 534/618 |

FOREIGN PATENT DOCUMENTS

| | | | |
|---|---|---|---|
| 41922 | 12/1981 | European Pat. Off. | 534/638 |
| 0377189 | 7/1990 | European Pat. Off. | 534/638 |
| 0429997 | 6/1991 | European Pat. Off. | 534/638 |
| 443165 | 8/1991 | European Pat. Off. | 534/632 |
| 513622 | 11/1992 | European Pat. Off. | 534/632 |
| 0513617 | 11/1992 | European Pat. Off. | 534/638 |
| 525572 | 2/1993 | European Pat. Off. | 534/632 |
| 526792 | 2/1993 | European Pat. Off. | 534/632 |
| 2920949 | 11/1980 | Germany | 534/638 |
| 2194953 | 3/1988 | United Kingdom | 534/638 |

*Primary Examiner*—Floyd D. Higel
*Attorney, Agent, or Firm*—Robert S. Honor; Carl W. Battle; Gabriel Lopez

[57] ABSTRACT

Fibre-reactive monoazo compounds of the formula

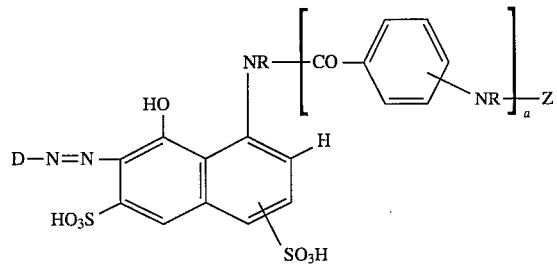

which compounds are in free acid or salt form, and mixtures thereof, are useful for dyeing or printing hydroxy group- or nitrogen-containing organic substrates, for example leather and fibre material comprising natural or synthetic polyamides or natural or regenerated cellulose; the most preferred substrate is a textile material comprising cotton.

18 Claims, No Drawings

FIBRE-REACTIVE MONOAZONAPHTHYL DYESTUFFS

This is a continuation of application Ser. No. 08/106,002, filed Aug. 13, 1993, now abandoned.

This invention relates to fibre-reactive monoazo compounds and a process for their production. These compounds are suitable for use as fibre-reactive dyestuffs in any conventional dyeing or printing processes.

More particularly, the invention provides compounds of formula I

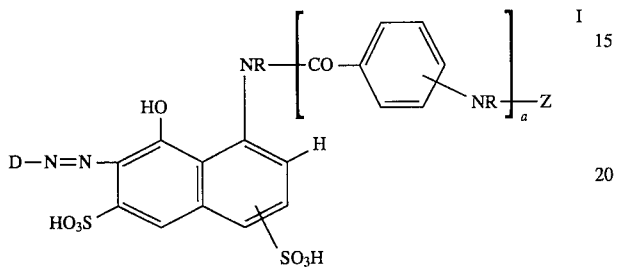

and salts thereof, or a mixture of such compounds or salts, in which each R is independently hydrogen, $C_{1-4}$alkyl or substituted $C_{1-4}$alkyl, a is 0 or 1, Z is

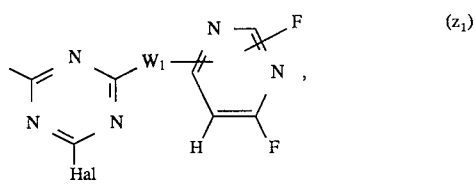 (z₁)

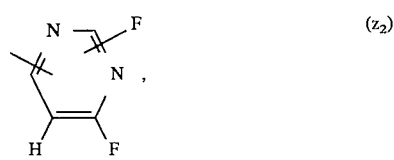 (z₂)

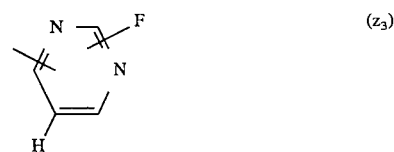 (z₃)

or

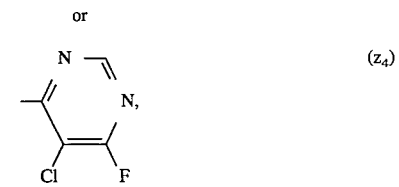 (z₄)

wherein

Hal is fluorine or chlorine, $W_1$ is

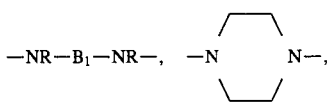

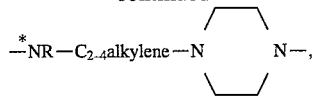

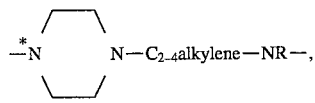

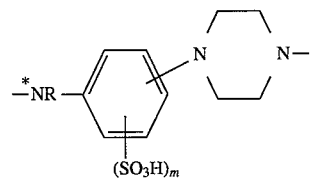

or

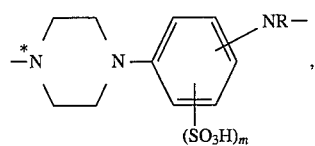

in which each m is independently 0 or 1, each marked nitrogen atom is bound to a carbon atom of the triazine ring, and $B_1$ is $C_{2-4}$alkylene; —$C_{2-3}$alkylene-Q-$C_{2-3}$alkylene- in which Q is —O— or —NR—; $C_{3-4}$alkylene which is monosubstituted by hydroxy;

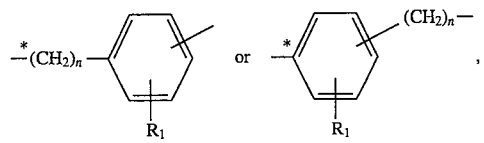

in which n is 0 or an integer 1 to 4, $R_1$ is hydrogen, $C_{1-4}$alkyl, $C_{1-4}$alkoxy, carboxy or sulpho, and each marked carbon atom is attached to the —NR group which is bound to the carbon atom of the triazine ring;

D is $D_1$, $D_2$ or $D_3$ where $D_1$ is

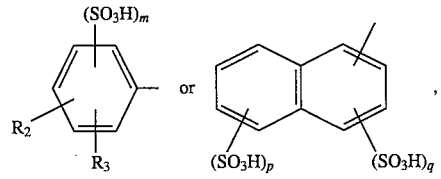

$D_2$ is

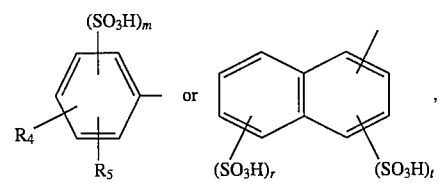

$D_3$ is

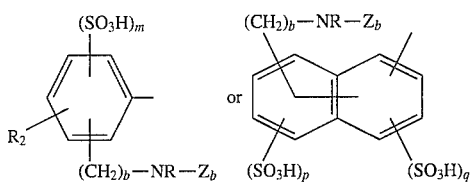

in which
each of $R_2$ and $R_3$ is independently hydrogen, halogen, $C_{1-4}$alkyl, $C_{1-4}$alkoxy, carboxy or sulpho,
$R_4$ is $C_{1-4}$alkyl, $C_{1-4}$alkoxy, —$SO_2NH_2$, carboxy or sulpho,
$R_5$ is hydrogen, $C_{1-4}$alkyl, $C_{1-4}$alkoxy, hydroxy, carboxy or acetamido;
p is 0, 1 or 2, q is 0 or 1 and p+q is 1 or 2;
r is 0, 1 or 2, t is 0 or 1 and r+t is 1, 2 or 3;
b is 0 or 1, and
$Z_b$ is

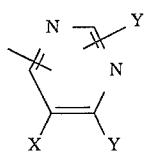

in which
X is hydrogen, chloro or cyano, and the two Y's are the same and each is fluoro or chloro;
with the provisos that
(i) D is $D_1$, and Z is $(z_1)$;
(ii) D is $D_2$, a is 1, the —NR radical attached to the naphthalene ring is —NH, and Z is $(z_2)$, $(z_3)$ or $(z_4)$; and
(iii) D is $D_3$, and Z is $(z_1)$ or $(z_2)$.

Representative compounds and salts of formula I are (1) those of Group (i), (2) those of Group (ii) and (3) those of Group (iii).

In the specification, any alkyl, alkoxy or alkylene group present is linear or branched unless indicated otherwise. In any hydroxy-substituted alkyl or alkylene group which is attached to a nitrogen atom, the hydroxy group is preferably bound to a carbon atom which is not directly attached to the nitrogen atom. In any alkylene chain interrupted by Q which is attached to a nitrogen atom, Q is preferably bound to a carbon atom which is not directly attached to the nitrogen atom.

Preferably, each halogen is independently fluorine, chlorine or bromine, more preferably fluorine or chlorine and especially chlorine.

When Z is $(z_1)$, a is preferably 0.

Hal is most preferably chlorine.

When R is a substituted alkyl group, it is preferably monosubstituted by hydroxy, cyano or chloro.

Each R is preferably $R_a$, where each $R_a$ is independently hydrogen, methyl, ethyl or 2-hydroxyethyl. More preferably, it is $R_b$, where each $R_b$ is independently hydrogen or methyl. Most preferably, each R is hydrogen.

$R_1$ is preferably $R_{1a}$, where $R_{1a}$ is hydrogen, methyl, methoxy, carboxy or sulpho; more preferably $R_1$ is $R_{1b}$, where $R_{1b}$ is hydrogen or sulpho.

$B_1$ is preferably $B_{1a}$, where $B_{1a}$ is $C_{2-3}$alkylene, —$CH_2CH_2$—$NR_a$—$CH_2CH_2$—, monohydroxy-substituted $C_{3-4}$alkylene,

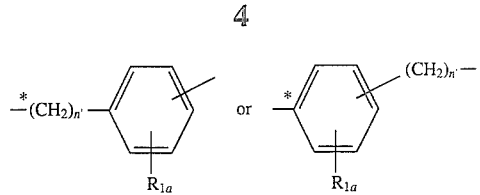

in which n' is 0 or 1.

More preferably, B is $B_{1b}$, where $B_{1b}$ is $C_{2-3}$alkylene,

—$CH_2CH_2$—$NR_b$—$CH_2CH_2$—, —$CH_2CH(OH)CH_2$— or

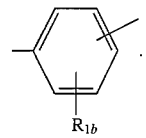

Most preferably, $B_1$ is $B_{1c}$, where $B_{1c}$ is —$CH_2CH_2$—, —$CH_2CH_2CH_2$—, —*$CH_2CH(CH_3)$— (in which the marked carbon atom is bound to the —NR group which is attached to the carbon atom of the triazine ring) or —$CH_2CH(OH)CH_2$—.

$W_1$ is preferably $W_{1a}$, where $W_{1a}$ is

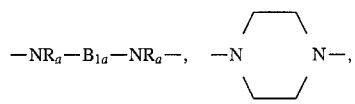

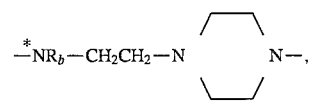

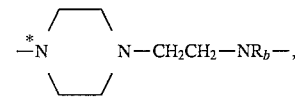

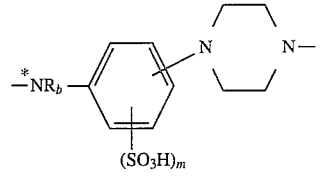

or

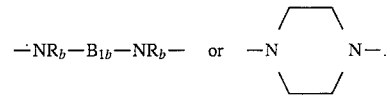

More preferably, $W_1$ is $W_{1b}$, where $W_{1b}$ is

—$NR_b$—$B_{1b}$—$NR_b$— or —N⟨⟩N—.

Most preferably, it is $W_{1c}$, where $W_{1c}$ is —*NH—$B_{1c}$—$NR_b$—, in which the marked nitrogen atom is bound to a carbon atom of the triazine ring.

($z_1$) is preferably ($z_1'$) of the formula

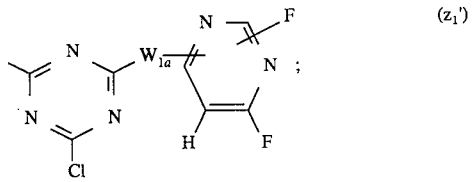

more preferably, ($z_1''$) which is of formula ($z_1'$) in which $W_{1a}$ is $W_{1b}$; most preferably ($z_1'''$) which is of formula ($z_1'$) in which $W_{1a}$ is $W_{1c}$.

($z_3$) is preferably ($z_3'$) having the formula

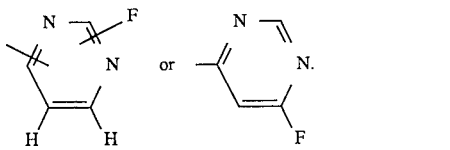

Each of $R_2$ and $R_3$ is preferably $R_{2a}$ and $R_{3a}$, where each of $R_{2a}$ and $R_{3a}$ is independently hydrogen, chlorine, methyl, methoxy, carboxy or sulpho. More preferably, each $R_2$ is $R_{2b}$, where each $R_{2b}$ is hydrogen, carboxy or sulpho, and $R_3$ is $R_{3b}$, where $R_{3b}$ is hydrogen, methyl or methoxy.

$R_4$ is preferably $R_{4a}$, where $R_{4a}$ is methyl, methoxy, carboxy or sulpho. $R_5$ is preferably $R_{5a}$, where $R_{5a}$ is hydrogen, methyl, methoxy, hydroxy or acetamido; $R_5$ is most preferably hydrogen.

q is preferably 1 and p is preferably p' which is 0 or 1.

$D_1$ is preferably $D_{1a}$ of the formula

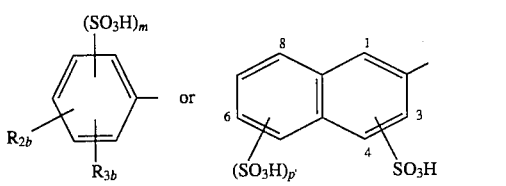

in which in the naphthalene ring the positions of the sulpho groups are as follows:
when p' is 0 the sulpho group is preferably in the 1-position;
when p' is 1 the sulpho groups are preferably in the 1,5-, 3,6- or 4,8-positions.

$D_2$ is preferably $D_{2a}$ of the formula

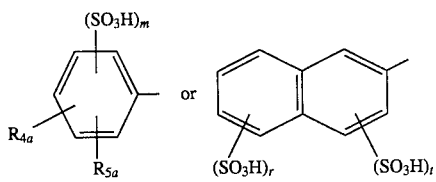

in which r+t is 1 or 2.

More preferably, $D_2$ is $D_{2b}$ of the formula

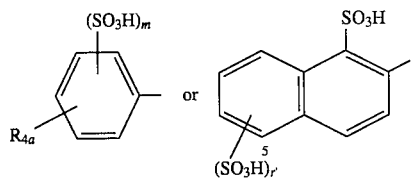

in which r' is 0 or 1; if r' is 1 the sulpho group is more preferably in the 5-position.

$Z_b$ is preferably $Z_b'$ of the formula

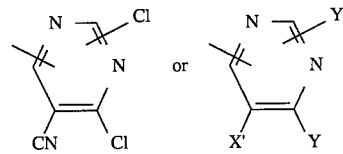

in which X' is hydrogen or chlorine.

$D_3$ is preferably $D_{3a}$ of the formula

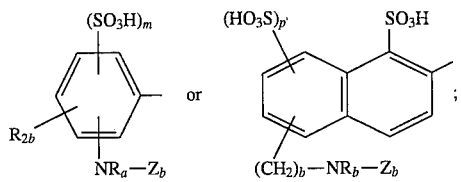

more preferably $D_{3b}$ of the formula

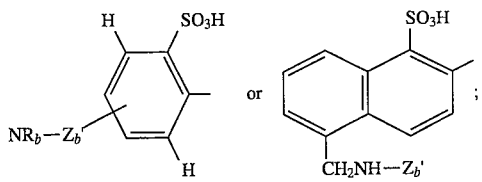

most preferably it is $D_{3c}$ of the formula

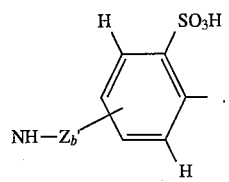

Preferred compounds of formula I are those in which D is $D_1$, a is 0 and Z is ($z_1$), especially ($z_1'''$); or those in which D is $D_3$, a is 0 and Z is ($z_1$), in which more preferably Hal is chlorine.

More preferred compounds of formula I correspond to formulae Ia, Ib and Ic,

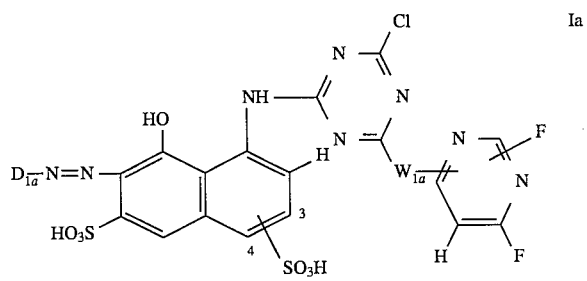

and salts thereof;
even more preferred are compounds and salts of formula Ia, in which
(1) $W_{1a}$ is $W_{1b}$;
(2) $W_{1a}$ is $W_{1c}$;
(3) those of (1) or (2), in which the sulpho group is in the 3-position of the naphthyl radical;

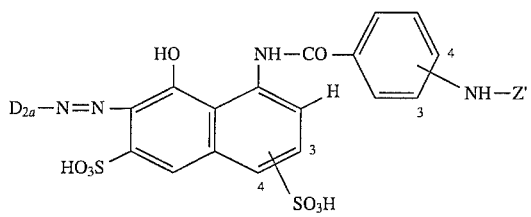

Ib and salts thereof, in which Z' is ($z_2$), ($z_3'$) or ($z_4$);
even more preferred are compounds and salts of formula Ib, in which (1) $D_{2a}$ is $D_{2b}$,
(2) the sulpho group is in the 3-position of the naphthyl radical;
(3) those of (1) or (2), in which Z' is ($z_2$);
(4) those of (3), in which the radical —NH—Z' bound to the phenyl radical is in the 3- or 4-position;

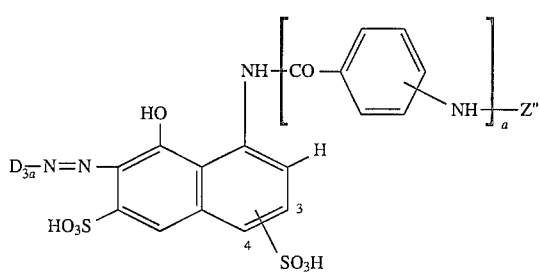

Ic and salts thereof, in which Z" is ($z_1'$) or ($z_2$);
even more preferred are compounds and salts of formula Ic, in which (1) $D_{3a}$ is $D_{3b}$;
(2) $D_{3a}$ is $D_{3c}$;
(3) the sulpho group is in the 3-position of the naphthyl radical;
(4) those of (1) to (3), in which a is 0;
(5) those of (4), in which Z" is ($z_1''$);
(6) those of (5), in which Z" is ($z_1'''$).

The compounds and salts of formula Ia are the preferred compounds and salts of Group (i), the compounds and salts of formula Ib are the preferred compounds and salts of Group (ii), and the compounds and salts of formula Ic are the preferred compounds and salts of Group (iii).

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri- ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds of formula I or mixtures thereof:

a) Compounds of formula I in which D is $D_1$, are prepared comprising reacting 1 mole of a compound of formula II,

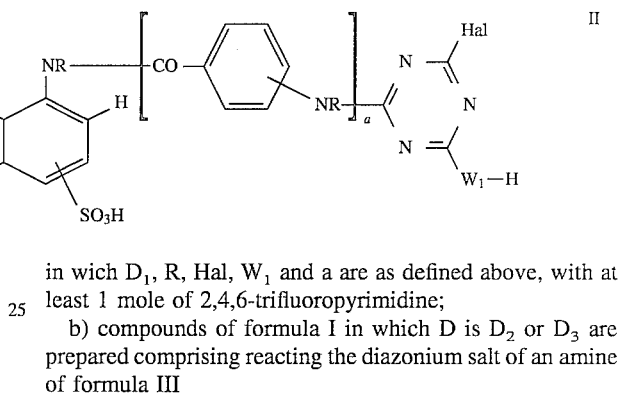

II in wich $D_1$, R, Hal, $W_1$ and a are as defined above, with at least 1 mole of 2,4,6-trifluoropyrimidine;

b) compounds of formula I in which D is $D_2$ or $D_3$ are prepared comprising reacting the diazonium salt of an amine of formula III $$D_x—NH_2 \quad\quad III$$

in which $D_x$ is $D_2$ or $D_3$ as defined above, with a compound of formula IV

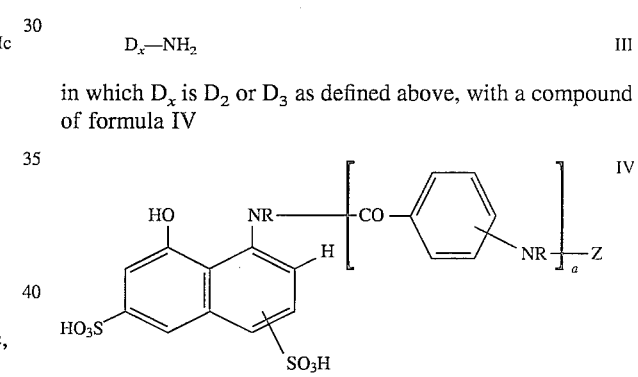

IV in which R, Z and a are as defined above.

The condensation reaction of the amino compound with 2,4,6-trifluoropyrimidine according to a) is carried out in a manner known per se, preferably at 20° to 50° C., more preferably at 30° to 40° C., and at a pH of about 7.

The diazotisation and coupling reactions according to b) are effected in accordance with conventional methods; coupling is preferably carried out at 5° to 30° C. and in a weakly acid to neutral aqueous reaction medium at a pH of 5 to 7.

The compounds of formula I may be isolated in accordance with known methods, for example, by conventional salting out with an alkali metal salt, filtering and drying optionally in vacuo and at slightly elevated temperatures.

Depending on the reaction and isolation conditions, a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that any group Z or $Z_b$ which is or contains a pyrimidinyl radical with a floating fluoro or chloro substituent according to the formula

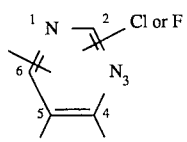

can occur in two isomeric forms where the floating fluoro or chloro substituent is bound either to the 2- or to the 6-position.

In general, it is preferred to use this mixture as it is without resorting to the isolation of a single isomer for use, but should this be desired it can be readily achieved by conventional methods.

The starting compounds of formulae II, III and IV are either known compounds or may be readily made from known starting materials by known methods using conventional diazotisation, coupling or condensation reactions.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of 30° to 100° C., particularly at 50°–60° C. and 80°–100° C., respectively, whereby a liquor to goods ratio of 6:1 to 30:1 is used and more preferably of 10:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

The following examples illustrate the invention. In the examples all parts and percentages are by weight unless indicated to the contrary, and all temperatures are given in degrees Centigrade.

EXAMPLE 1

82 Parts of cyanuric chloride are stirred into 200 parts of water at 15°–20° to yield a homogeneous suspension. A neutral reacting solution (pH of 7) of 310 parts of the trisodium salt of the dyestuff having the formula

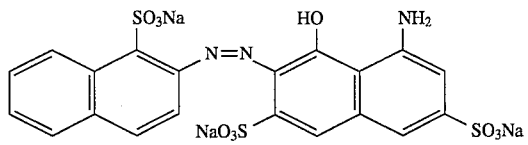

in 3000 parts of water is added to this suspension. Stirring is effected at 15°–20° until the free amino group is no longer detectable. During the condensation reaction, the pH of the mixture is kept at 5.6–6.0 by the addition of dilute sodium hydroxide solution.

40 Parts of 1,2-diaminopropane are mixed with 1000 parts of water and 400 parts of ice. The pH of this mixture is adjusted to 6.0–6.5 by adding 90 parts by volume of approximately 30% hydrochloric acid solution. The resulting solution is added at once to the dyestuff suspension prepared above, and reacting is effected by heating to 45°–50° for ca. six hours and maintaining a pH of 6.0–6.5 by the addition of sodium hydroxide solution. After the reaction is completed, the mixture is cooled to 30°–35° and then 80 parts of 2,4,6-trifluoropyrimidine (a 20% excess) are added to the suspension. The mixture is stirred for two hours at 30°–35°, simultaneously, the pH is kept at 7.0–7.5 by adding sodium hydroxide solution. From the reaction mixture, the dyestuff thus obtained is precipitated by the addition of 400 parts of sodium chloride, then filtered off and dried in a cabinet dryer at 50°. The dyestuff corresponds to the formula;

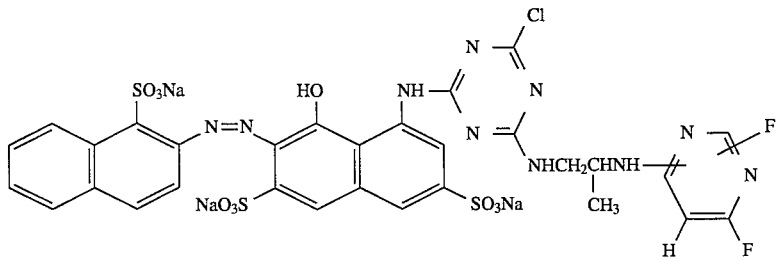

when dried it is a dark red powder which dissolves in water with a dark red colour. The dyestuff dyes cotton a bluish-red shade. These cotton dyeings exhibit notably good fastness properties.

EXAMPLES 2 TO 100

By analogy with the method described in Example 1, using appropriate starting compounds, further compounds of formula I may be prepared which are listed in the following Tables 1 and 2. They correspond to the formulae (T1) and (T2),

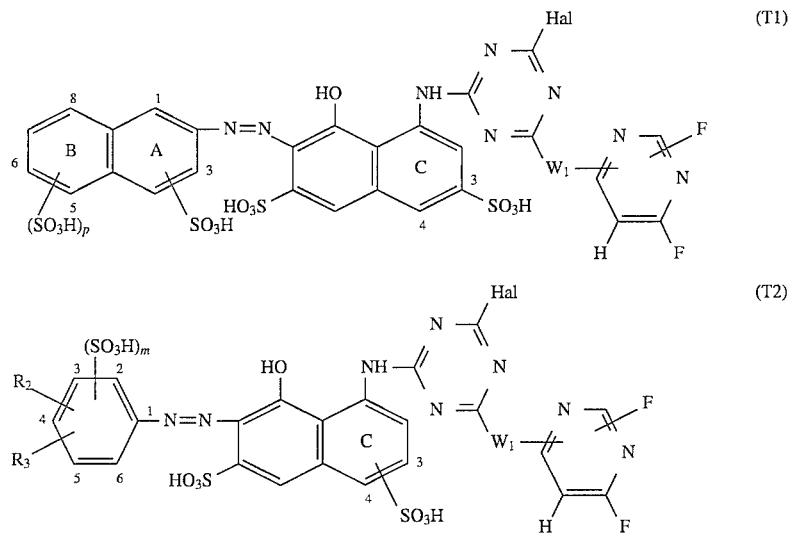

in which the symbols are as defined in Tables 1 and 2.

In the column of —$W_1$—, the marked nitrogen atom is bound to a carbon atom of the triazine ring.

The compounds of Examples 2 to 100 may be applied to substrates which comprise cellulose fibres, and particularly to textile material comprising cotton using the conventional exhaust dyeing method or conventional printing processes, where dyeings and prints in bluish-red shades are obtained. These dyeings and prints on cotton show good light- and wet-fastness properties and are resistant to oxidative influences.

TABLE 1

Examples 2 to 37
Compounds of formula (T1)

| Ex. No. | p | position of $SO_3H$ in rings A/B | position of $SO_3H$ in ring C | Hal | —$W_1$— |
|---|---|---|---|---|---|
| 2 | 1 | 1,5 | 3 | Cl | —*NHCH$_2$CHNH— <br> \| <br> CH$_3$ |
| 3 | 0 | 1 | 4 | Cl | " |
| 4 | 1 | 1,5 | 3 | F | " |
| 5 | 1 | 1,5 | 4 | Cl | " |
| 6 | 1 | 3,6 | 3 | Cl | " |
| 7 | 1 | 3,6 | 4 | Cl | " |
| 8 | 1 | 4,8 | 3 | Cl | " |
| 9 | 1 | 4,8 | 4 | Cl | " |
| 10 | 0 | 1 | 3 | Cl | —NHCH$_2$CH$_2$NH— |
| 11 | 1 | 1,5 | 4 | Cl | " |
| 12 | 1 | 3,6 | 3 | Cl | " |
| 13 | 1 | 3,6 | 3 | F | " |
| 14 | 1 | 3,6 | 4 | Cl | " |
| 15 | 1 | 4,8 | 3 | Cl | " |
| 16 | 0 | 1 | 3 | Cl | —NHCH$_2$CHCH$_2$NH— <br> \| <br> OH |
| 17 | 0 | 1 | 4 | Cl | " |
| 18 | 1 | 1,5 | 3 | Cl | " |
| 19 | 1 | 3,6 | 3 | Cl | " |
| 20 | 1 | 1,5 | 4 | F | —NHCH$_2$CHCH$_2$NH— <br> \| <br> OH |
| 21 | 0 | 1 | 3 | Cl | —NHCH$_2$CH$_2$CH$_2$NH— |
| 22 | 0 | 1 | 4 | Cl | " |
| 23 | 1 | 1,5 | 3 | Cl | " |
| 24 | 1 | 3,6 | 3 | Cl | " |

TABLE 1-continued

Examples 2 to 37
Compounds of formula (T1)

| Ex. No. | p | position of SO$_3$H in rings A/B | position of SO$_3$H in ring C | Hal | —W$_1$— |
|---|---|---|---|---|---|
| 25 | 0 | 1 | 3 | Cl | —N⟨ ⟩N— (piperazine) |
| 26 | 0 | 1 | 4 | Cl | " |
| 27 | 1 | 1,5 | 3 | Cl | " |
| 28 | 1 | 1,5 | 4 | Cl | " |
| 29 | 0 | 1 | 3 | Cl | —NHCH$_2$CH$_2$CH$_2$N(CH$_3$)— |
| 30 | 0 | 1 | 4 | Cl | " |
| 31 | 0 | 1 | 3 | F | " |
| 32 | 1 | 1,5 | 3 | Cl | " |
| 33 | 1 | 1,5 | 4 | Cl | " |
| 34 | 0 | 1 | 3 | Cl | —*NHCH$_2$CH$_2$N(CH$_2$CH$_2$OH)— |
| 35 | 0 | 1 | 4 | Cl | " |
| 36 | 1 | 1,5 | 3 | Cl | " |
| 37 | 1 | 1,5 | 4 | Cl | " |

TABLE 2

Examples 38 to 100
Compounds of formula (T2)

| Ex. No. | m (position of SO$_3$H) | R$_2$ | R$_3$ | position of SO$_3$H in ring C | Hal | —W$_1$— |
|---|---|---|---|---|---|---|
| 38 | 1 (2) | H | H | 3 | Cl | —*NHCH$_2$CHNH— \| CH$_3$ |
| 39 | " | 5-SO$_3$H | H | 3 | Cl | " |
| 40 | " | " | H | 3 | F | " |
| 41 | " | " | 4-CH$_3$ | 3 | Cl | " |
| 42 | " | " | 4-OCH$_3$ | 3 | Cl | " |
| 43 | " | H | 4-CH$_3$ | 3 | Cl | " |
| 44 | " | H | 4-OCH$_3$ | 3 | Cl | " |
| 45 | " | 4-SO$_3$H | H | 3 | Cl | " |
| 46 | " | H | H | 4 | Cl | " |
| 47 | " | H | H | 4 | F | " |
| 48 | " | 5-SO$_3$H | H | 4 | Cl | " |
| 49 | " | 4-SO$_3$H | H | 4 | Cl | " |
| 50 | 1 (2) | H | H | 3 | Cl | —NHCH$_2$CH$_2$NH— |
| 51 | " | 5-SO$_3$H | H | 3 | Cl | " |
| 52 | " | " | 4-CH$_3$ | 3 | Cl | " |
| 53 | " | " | 4-OCH$_3$ | 3 | Cl | " |
| 54 | " | H | 4-CH$_3$ | 3 | Cl | " |
| 55 | " | H | 4-OCH$_3$ | 3 | Cl | " |
| 56 | " | 4-SO$_3$H | H | 3 | Cl | " |
| 57 | " | H | H | 4 | Cl | " |
| 58 | " | 5-SO$_3$H | H | 4 | Cl | " |
| 59 | " | " | 4-OCH$_3$ | 4 | Cl | " |
| 60 | " | H | 4-CH$_3$ | 4 | Cl | " |
| 61 | " | H | H | 3 | Cl | —NHCH$_2$CHCH$_2$NH— \| OH |
| 62 | " | H | H | 3 | F | " |
| 63 | " | 5-SO$_3$H | H | 3 | Cl | " |
| 64 | " | " | 4-CH$_3$ | 3 | Cl | " |
| 65 | " | " | 4-OCH$_3$ | 3 | Cl | " |

TABLE 2-continued

Examples 38 to 100
Compounds of formula (T2)

| Ex. No. | m (position of SO$_3$H) | R$_2$ | R$_3$ | position of SO$_3$H in ring C | Hal | —W$_1$— |
|---|---|---|---|---|---|---|
| 66 | 1 (2) | 5-SO$_3$H | H | 4 | Cl | —NHCH$_2$CHCH$_2$NH—<br>\|<br>OH |
| 67 | " | " | 4-CH$_3$ | 4 | Cl | " |
| 68 | " | H | H | 3 | Cl | —NHCH$_2$CH$_2$CH$_2$NH— |
| 69 | " | 5-SO$_3$H | H | 3 | Cl | " |
| 70 | " | " | H | 3 | F | " |
| 71 | " | " | 4-CH$_3$ | 3 | Cl | " |
| 72 | " | " | 4-OCH$_3$ | 4 | Cl | " |
| 73 | " | H | 4-CH$_3$ | 3 | Cl | " |
| 74 | " | H | 4-OCH$_3$ | 4 | Cl | " |
| 75 | " | H | H | 3 | Cl | —N⟨   ⟩N— (piperazine) |
| 76 | " | H | H | 4 | Cl | " |
| 77 | " | H | H | 3 | F | " |
| 78 | " | 5-SO$_3$H | H | 3 | Cl | " |
| 79 | " | " | 4-CH$_3$ | 3 | Cl | " |
| 80 | 1 (2) | H | H | 3 | Cl | —*NHCH$_2$CH$_2$CH$_2$N—<br>\|<br>CH$_3$ |
| 81 | " | 5-SO$_3$H | H | 4 | Cl | " |
| 82 | " | " | 4-CH$_3$ | 3 | Cl | " |
| 83 | " | " | 4-OCH$_3$ | 3 | Cl | " |
| 84 | " | H | H | 3 | Cl | —*NHCH$_2$CH$_2$N—<br>\|<br>CH$_2$CH$_2$OH |
| 85 | " | 5-SO$_3$H | H | 3 | Cl | " |
| 86 | " | " | 4-CH$_3$ | 4 | Cl | " |
| 87 | 0 | 2-COOH | H | 3 | Cl | —*NHCH$_2$CHNH—<br>\|<br>CH$_3$ |
| 88 | 0 | " | H | 4 | Cl | " |
| 89 | 0 | 3-COOH | H | 3 | Cl | " |
| 90 | 0 | " | H | 3 | F | " |
| 91 | 0 | 4-COOH | H | 3 | Cl | " |
| 92 | 0 | 2-COOH | H | 3 | Cl | —NHCH$_2$CH$_2$NH— |
| 93 | 0 | 3-COOH | H | 4 | Cl | " |
| 94 | 0 | 4-COOH | H | 3 | Cl | " |
| 95 | 0 | 3-COOH | H | 3 | Cl | —NHCH$_2$CHCH$_2$NH—<br>\|<br>OH |
| 96 | 0 | " | H | 4 | Cl | " |
| 97 | 0 | 2-COOH | H | 3 | Cl | —NHCH$_2$CH$_2$CH$_2$NH— |
| 98 | 0 | " | H | 3 | F | " |
| 99 | 0 | 3-COOH | H | 3 | Cl | —*NHCH$_2$CH$_2$CH$_2$N—<br>\|<br>CH$_3$ |
| 100 | 0 | 4-COOH | H | 3 | Cl | " |

EXAMPLE 101

18 Parts of cyanuric chloride are stirred into a mixture of 40 parts of water and 80 parts of ice to yield a homogeneous suspension. To this a neutral reacting solution (pH 7) of 30 parts of 1-amino-8-hydroxy-naphthalene-3,6-disulphonic acid in 150 parts of water is added, and the mixture is stirred at ca. 20° and a pH of 5.5–6.0 until the free amino group is no longer detectable. Subsequently at a pH of 6.5–7.0, 8 parts of 1,2-diaminopropane are added rapidly. Stirring is effected for three hours at ca. 45°. After this time the reaction of the starting compounds is completed. A light beige suspension is obtained which is cooled to 15° and to which 15 parts of 2,4,6-trifluoropyrimidine are added. After stirring for about two hours, the suspension is cooled to 5°.

In a second vessel, 14 parts of 2,4,6-trifluoropyrimidine are added to 18 parts of 2,5-diaminobenzene sulphonic acid (dissolved in 100 parts of water) at ca. 10° and at a pH of 5.0–5.5. This mixture is stirred for about two hours. Condensation is effected with the amino group in the 5-position, exclusively. Subsequently, the free amino group in the 2-position is diazotised according to a conventional method. To the resulting diazo suspension, the above suspension cooled to 5° is added within one hour at ca. 5° and pH 6–7. Stirring is effected for a further two hours at 5°–10°. A red dyestuff is formed which (in free acid form) corresponds to the formula $Z_3$ is 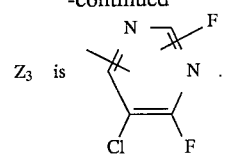

The compounds of Examples 102 to 129 may be applied to substrates which comprise cellulose fibres, and particularly to textile material comprising cotton using the conventional exhaust dyeing method or conventional printing processes, where dyeings and prints in bluish-red shades are obtained. These dyeings and prints on cotton show good fastness properties.

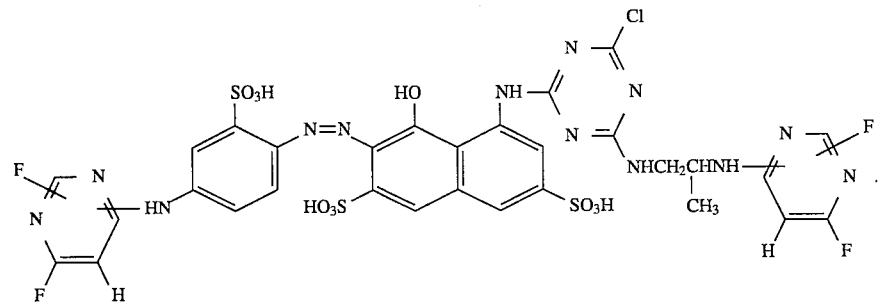

The dyestuff is precipitated from the reaction mixture using ca. 50 parts of sodium chloride and is filtered. When dried it is a dark red powder which dissolves in water with a red colour. The dyestuff dyes cotton a bluish-red shade. The cotton dyeings thus obtained exhibit very good fastness properties.

EXAMPLES 102 TO 129

By analogy with the method described in Example 101, using appropriate starting compounds, further compounds of formula I may be prepared which are listed in the following Table 3. They correspond to the formula (T3),

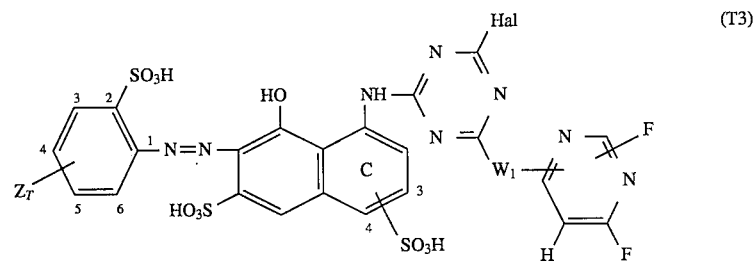 (T3)

in which the symbols are as defined in Table 3.

In the column of —$W_1$—, the marked nitrogen atom is bound to a carbon atom of the triazine ring.

Furthermore, in Table 3 the following radicals $Z_1$ to $Z_3$ are used for the entity $Z_T$:

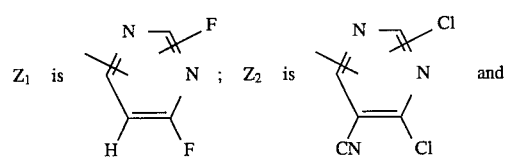

TABLE 3

Compounds of formula (T3)

| Ex. No. | $Z_T$ (position) | position of SO₃H in ring C | Hal | —$W_1$— |
|---|---|---|---|---|
| 102 | $Z_2$ (5) | 3 | Cl | —*NHCH₂CHNH— <br>                    CH₃ |
| 103 | $Z_1$ (5) | 3 | Cl | " |
| 104 | $Z_3$ (5) | 3 | Cl | " |
| 105 | $Z_1$ (4) | 4 | Cl | " |
| 106 | " | 3 | F | " |
| 107 | " | 3 | Cl | —NHCH₂CHCH₂NH— <br>                 OH |
| 108 | " | 4 | Cl | " |
| 109 | $Z_2$ (5) | 3 | Cl | " |
| 110 | $Z_1$ (5) | 3 | Cl | —NHCH₂CH₂CH₂NH— |
| 111 | $Z_1$ (4) | 3 | Cl | " |
| 112 | $Z_2$ (5) | 3 | Cl | " |
| 113 | $Z_2$ (5) | 3 | Cl | —N⟨piperazine⟩N— |
| 114 | $Z_1$ (5) | 3 | Cl | " |
| 115 | $Z_3$ (5) | 3 | Cl | " |
| 116 | $Z_2$ (5) | 4 | Cl | " |
| 117 | $Z_1$ (5) | 4 | Cl | " |
| 118 | $Z_3$ (5) | 4 | Cl | " |
| 119 | $Z_2$ (4) | 3 | Cl | " |
| 120 | $Z_1$ (4) | 3 | Cl | " |
| 121 | $Z_2$ (5) | 3 | Cl | —NHCH₂CH₂NH— |
| 122 | $Z_1$ (5) | 3 | Cl | " |
| 123 | $Z_1$ (5) | 3 | F | " |
| 124 | $Z_3$ (5) | 3 | Cl | " |
| 125 | $Z_2$ (5) | 4 | Cl | " |
| 126 | $Z_1$ (5) | 4 | Cl | " |
| 127 | $Z_1$ (4) | 3 | Cl | —*NHCH₂CH₂CH₂N— <br>                       CH₃ |
| 128 | $Z_3$ (5) | 3 | Cl | " |
| 129 | $Z_2$ (4) | 3 | Cl | —*NHCH₂CH₂N— <br>                 CH₂CH₂OH |

EXAMPLE 130

220 Parts of 1-(3'-aminobenzoylamino)-8-hydroxynaphthalene-3,6-disulphonic acid are suspended in 700 parts of water. To this suspension, 55 parts of calcium carbonate and 75 parts of 2,4,6-trifluoropyrimidine are added successively, and the reaction mixture is stirred for five hours at 0° to 5°.

160 Parts of 2-aminonaphthalene-1,5-disulphonic acid in 500 parts of a mixture of ice and water are diazotised in a conventional manner. This diazo suspension is added all at once to the suspension prepared above which contains the coupling component. Coupling is effected at ca. 20° and pH 5–6 and is complete within one hour. A red dyestuff is obtained which is salted out from the reaction mixture by adding 500 parts of sodium chloride. The dyestuff (in free acid form) corresponds to the formula

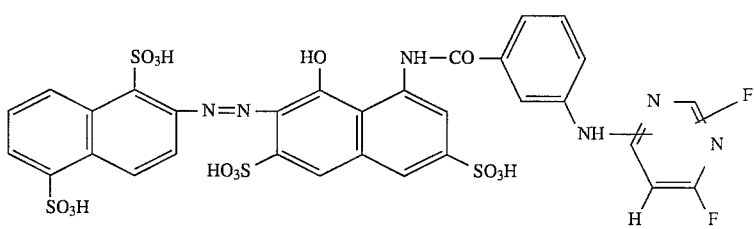

and dyes cotton a brilliant bluish-red shade. These cotton dyeings show good general fastness properties.

EXAMPLES 131 TO 178

By analogy with the method described in Example 130, using appropriate starting material, further compounds of formula I may be prepared which are listed in the following Tables 4 and 5. They correspond to the formulae (T4) and (T5),

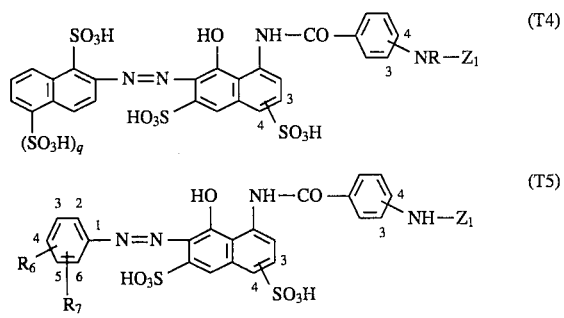

in which formulae $Z_1$ is

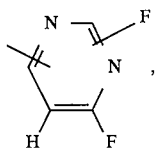

and the other symbols are defined in Tables 4 and 5.

The compounds of Examples 131 to 178 may be applied to substrates which comprise cellulose fibres, and particularly to textile material comprising cotton using the conventional exhaust dyeing method or conventional printing processes, where dyeings and prints in bluish-red shades are obtained. These dyeings and prints on cotton show good light- and wet-fastness properties and are resistant to oxidative influences.

TABLE 4

Examples 131 to 139
Compounds of formula (T4)

| Ex. No. | q | position of —SO$_3$H | position of —NR—Z$_1$ | R$_1$ |
|---|---|---|---|---|
| 131 | 0 | 3 | 3 | H |
| 132 | 0 | 3 | 4 | H |
| 133 | 0 | 4 | 3 | H |
| 134 | 0 | 4 | 4 | H |
| 135 | 1 | 3 | 4 | H |
| 136 | 1 | 4 | 3 | H |
| 137 | 1 | 4 | 4 | H |
| 138 | 0 | 4 | 3 | CH$_3$ |
| 139 | 1 | 3 | 3 | CH$_3$ |

TABLE 5

Examples 140 to 178
Compounds of formula (T5)

| Ex. No. | R$_6$ (position) | R$_7$ (position) | position of —SO$_3$H | position of —NH—Z$_1$ |
|---|---|---|---|---|
| 140 | —SO$_3$H | 4-SO$_3$H | 3 | 3 |
| 141 | —SO$_3$H | 5-SO$_3$H | 3 | 3 |
| 142 | —SO$_3$H | H | 3 | 3 |
| 143 | —SO$_3$H | H | 3 | 3 |

TABLE 5-continued

Examples 140 to 178
Compounds of formula (T5)

| Ex. No. | R$_6$ (position) | R$_7$ (position) | position of —SO$_3$H | position of —NH—Z$_1$ |
|---|---|---|---|---|
| 144 | —SO$_3$H | H | 3 | 3 |
| 145 | —SO$_2$NH$_2$ | H | 3 | 3 |
| 146 | —C$_4$H$_9$(n) | H | 3 | 3 |
| 147 | 2-COOH | 4-SO$_3$H | 3 | 3 |
| 148 | 3-COOH | 4-OH | 3 | 3 |
| 149 | 2-OH | 5-SO$_3$H | 3 | 3 |
| 150 | 2-SO$_3$H | 4-CH$_3$ | 3 | 3 |
| 151 | 2-CH$_3$ | 5-SO$_3$H | 3 | 3 |
| 152 | 2-CH$_3$ | 4-SO$_3$H | 3 | 3 |
| 153 | 2-COOH | 5-COOH | 3 | 3 |
| 154 | 2-SO$_3$H | 4-OCH$_3$ | 3 | 3 |
| 155 | 4-OCH$_3$ | H | 3 | 3 |
| 156 | 3-SO$_3$H | 5-SO$_3$H | 3 | 3 |
| 157 | 2-SO$_3$H | 4-NHCOCH$_3$ | 3 | 3 |
| 158 | 2-SO$_3$H | 5-NHCOCH$_3$ | 3 | 3 |
| 159 | 2-SO$_3$H | 4-SO$_3$H | 3 | 4 |
| 160 | 2-SO$_3$H | 5-SO$_3$H | 3 | 4 |
| 161 | 2-SO$_3$H | H | 3 | 4 |
| 162 | 2-COOH | 4-SO$_3$H | 3 | 4 |
| 163 | 3-COOH | 4-OH | 3 | 4 |
| 164 | 2-SO$_3$H | 4-CH$_3$ | 3 | 4 |
| 165 | 2-SO$_3$H | 4-OCH$_3$ | 3 | 4 |
| 166 | 4-OCH$_3$ | H | 3 | 4 |
| 167 | 3-SO$_3$H | 5-SO$_3$H | 3 | 4 |
| 168 | 2-SO$_3$H | 5-NHCOCH$_3$ | 3 | 4 |
| 169 | 2-SO$_3$H | 4-SO$_3$H | 4 | 3 |
| 170 | 2-SO$_3$H | H | 4 | 3 |
| 171 | 2-SO$_3$H | 4-CH$_3$ | 4 | 3 |
| 172 | 2-SO$_3$H | 4-OCH$_3$ | 4 | 3 |
| 173 | 2-SO$_3$H | 5-NHCOCH$_3$ | 4 | 3 |
| 174 | 2-SO$_3$H | 4-SO$_3$H | 4 | 4 |
| 175 | 2-SO$_3$H | H | 4 | 4 |
| 176 | 2-SO$_3$H | 4-CH$_3$ | 4 | 4 |
| 177 | 2-SO$_3$H | 4-OCH$_3$ | 4 | 4 |
| 178 | 2-SO$_3$H | 5-NHCOCH$_3$ | 4 | 4 |

By the preparation method described in Examples 1, 101 and 130, the compounds of Examples 1–178 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, the dyestuffs of Examples 1 to 178 (and the corresponding free acids and other salt forms) contain two isomeric compounds regarding the radical $Z_1$

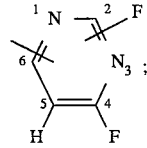

one compound in which the floating fluoro substituent on the pyrimidine ring is in the 2-position and the corresponding compound with the fluoro substituent in the 6-position. In an analogous fashion indicated for $Z_1$, also $Z_2$ and $Z_3$ are present in two appropriate isomeric forms with respect to the floating fluoro or chloro substituent. The obtained isomeric dyestuff mixtures may be used in conventional dyeing or printing processes; the isolation of a single isomer for use normally is unnecessary.

In the following examples the application of the compounds of this invention is illustrated.

APPLICATION EXAMPLE A 0.3 Part of the dyestuff of Example 1 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is kept at 50°. Subsequently, the dyebath is heated to 60°, and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A red cotton dyeing is obtained showing good fastness properties, and particularly high wet fastness properties, which is stable towards oxidative influences.

APPLICATION EXAMPLE B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 1 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying a red cotton dyeing is obtained which has the same good fastness properties as indicated in Application Example A.

Similarly, the dyestuffs of Examples 2–178 or mixtures of the exemplified dyestuffs may be employed to dye cotton in accordance with the method described in Application Example A or B. The cotton dyeings thus obtained are bluish-red and show good fastness properties.

APPLICATION EXAMPLE C

A printing paste consisting of
40 parts of the dyestuff of Example 1
100 parts of urea
350 parts of water
500 parts of a 4% sodium alginate thickener and
10 parts of sodium bicarbonate
1000 parts in all
is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A red print is obtained which has good general fastness properties.

Similarly, the dyestuffs of Examples 2 to 178 or mixtures of the exemplified dyestuffs may be employed to print cotton in accordance with the method given in Application Example C. All prints obtained are red and show good fastness properties.

What is claimed is:

1. A compound of formula I

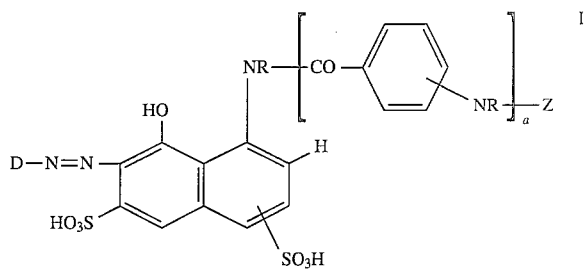

or salts thereof, or a mixture of such compounds of salts, in which each R is independently hydrogen, $C_{1-4}$alkyl, or $C_{1-4}$alkyl monosubstituted by OH, CN, or Cl, a is 0 or 1, Z is

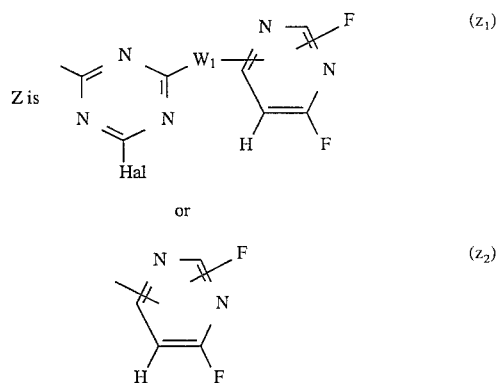

wherein

Hal is fluorine or chlorine, $W_1$ is

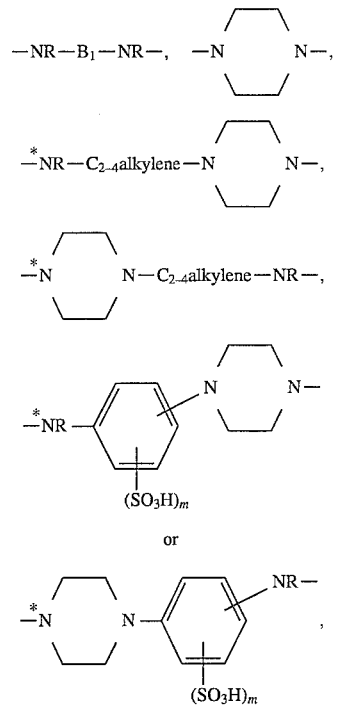

in which each m is independently 0 or 1, each marked nitrogen atom is bound to a carbon atom of the triazine ring, and $B_1$ is $C_{2-4}$alkylene; —$C_{2-3}$alkylene—Q—$C_{2-3}$alkylene- in which Q is —O— or —NR—; or $C_{3-4}$alkylene which is monosubstituted by hydroxy;

D is $D_1$, $D_2$ or $D_3$ where $D_1$ is

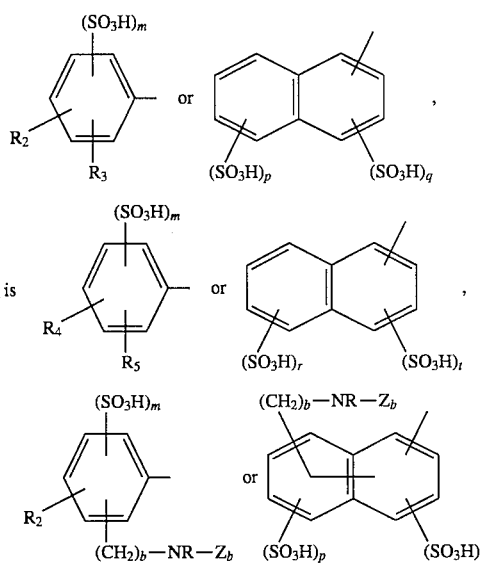

$D_2$ is $D_3$ is in which each of $R_2$ and $R_3$ is independently hydrogen, halogen, $C_{1-4}$alkyl, $C_{1-4}$alkoxy, carboxy, or sulpho;

$R_4$ is $C_{1-4}$alkyl, $C_{1-4}$alkoxy, —$SO_2NH_2$, or carboxy;

$R_5$ is hydrogen, $C_{1-4}$alkyl, $C_{1-4}$alkoxy, hydroxy, carboxy, or acetamido;

p is 0, 1 or 2, q is 0 or 1 and p+q is 1 or 2;

r is 0, 1 or 2, t is 0 or 1 and r+t is 1, 2 or 3;

b is 0 or 1; and $Z_b$ is

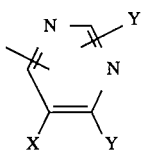

wherein

X is hydrogen, chloro or cyano, and the two Y's are the same and each is fluoro or chloro;

with the provisos that (i) when D is $D_1$, then Z is $(z_1)$;

(ii) when D is $D_2$, then a is 1, the —NR radical attached to the naphthalene ring is —NH, and Z is $(z_2)$; and (iii) when D is $D_3$, then Z is $(z_1)$ or $(z_2)$.

2. A compound according to claim 1, in which each R is $R_a$, where each $R_a$ is independently hydrogen, methyl, ethyl, or 2-hydroxyethyl.

3. A compound according to claim 1, in which Z is $(z_1)$ or $(z_2)$.

4. A compound according to claim 1, in which D is $D_1$ and a is 0.

5. A compound according to claim 4, in which $(z_1)$ is $(z_1''')$

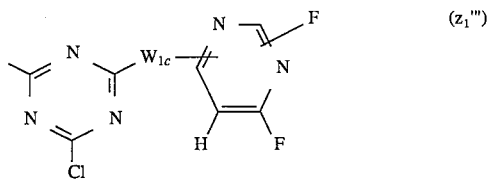

wherein $W_{1c}$ is —*NH—$B_{1c}$—$NR_b$— in which the marked nitrogen atom is bound to a carbon atom of the triazine ring, $B_{1c}$ is —$CH_2CH_2$—, —$CH_2CH_2CH_2$—, —*$CH_2CH(CH_3)$—, in which the marked carbon atom is bound to the —NH group, or —$CH_2CH(OH)CH_2$—, and $R_b$ is hydrogen or methyl.

6. A compound according to claim 1, in which D is $D_3$, a is 0 and Z is $(z_1)$.

7. A compound according to claim 6, in which in $(z_1)$ Hal is chlorine.

8. A compound according to claim 1 which corresponds to formula Ia

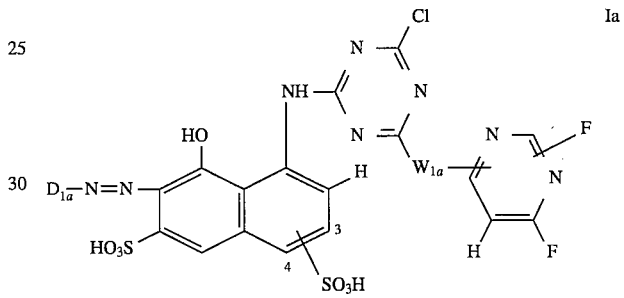

or a salt thereof, in which

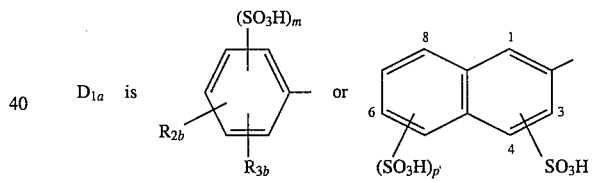

$R_{2b}$ is hydrogen, carboxy or sulpho, $R_{3b}$ is hydrogen, methyl or methoxy, each m is independently 0 or 1, and p' is 0 or 1, in which in the naphthalene ring the positions of the sulpho groups are as follows:
when p' is 0, the sulpho group is in the 1-position;
when p' is 1, the sulpho groups are in the 1,5-, 3,6- or 4,8-positions;

$W_{1a}$ is

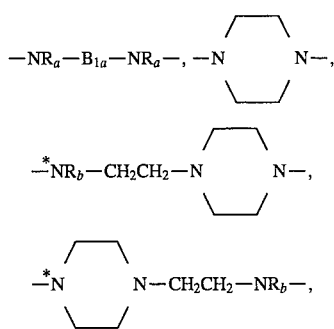

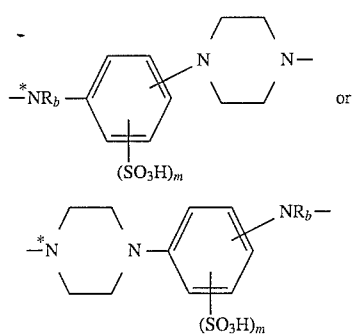

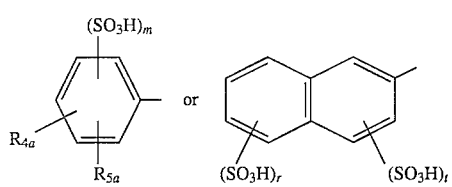

in which each marked nitrogen atom is bound to a carbon atom of the triazine ring, m is as defined above, each $R_a$ is independently hydrogen, methyl, ethyl, or 2-hydroxyethyl, $R_b$ is hydrogen or methyl, and $B_{1a}$ is $C_{2-3}$alkylene, —CH$_2$CH$_2$—NR$_a$—CH$_2$CH$_2$—, or monohydroxy-substituted $C_{3-4}$alkylene.

9. A compound according to claim 8, in which $W_{1a}$ is $W_{1c}$, where $W_{1c}$ is —*NH—B$_{1c}$—NR$_b$—, in which the marked nitrogen atom is bound to a carbon atom of the triazine ring, $B_{1c}$ is —CH$_2$CH$_2$—, —CH$_2$CH$_2$CH$_2$—, —*CH$_2$CH(CH$_3$)—, in which the marked carbon atom is bound to the —NH group, or —CH$_2$CH(OH)CH$_2$—, and $R_b$ is hydrogen or methyl.

10. A compound according to claim 1 which corresponds to formula Ib

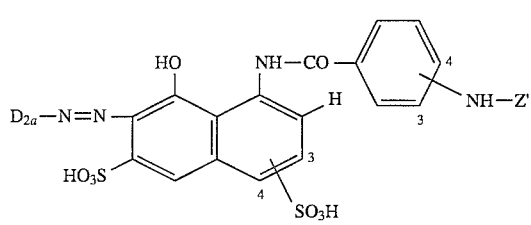

or a salt thereof, in which
$D_{2a}$ is

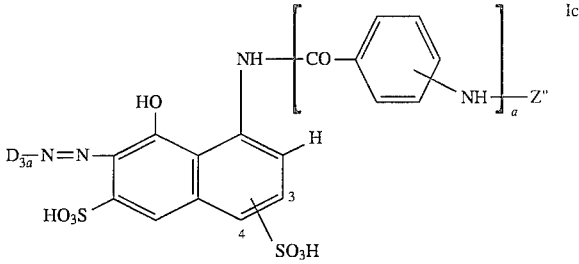

wherein $R_{4a}$ is methyl, methoxy, or carboxy;

$R_{5a}$ is hydrogen, methyl, methoxy, hydroxy, or acetamido;

m is 0 or 1;

r is 0, 1 or 2, t is 0 or 1, and r+t is 1 or 2; and

Z' is ($z_2$).

11. A compound according to claim 10, in which $D_{2a}$ is $D_{2b}$ of the formula

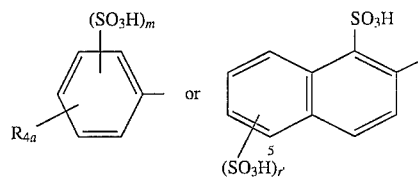

in which r' is 0 or 1 and if r' is 1, the sulpho group is in the 5-position.

12. A compound according to claim 10, in which the sulpho group of the naphthyl radical is in the 3-position, and the —NH—Z' radical is in the 3- or 4-position.

13. A compound according to claim 1 which corresponds to formula Ic

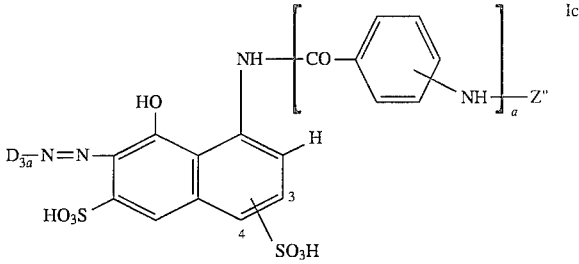

or a salt thereof, in which
$D_{3a}$ is

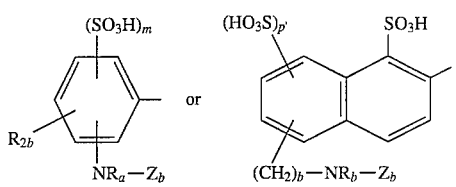

wherein each $R_a$ is independently hydrogen, methyl, ethyl, or 2-hydroxyethyl, each $R_b$ is independently hydrogen or methyl, $R_{2b}$ is hydrogen, carboxy or sulpho, each m is independently 0 or 1, b is 0 or 1, p' is 0 or 1, a is 0 or 1, Z" is ($z_1'$) or ($z_2$) where ($z_1'$) has the formula

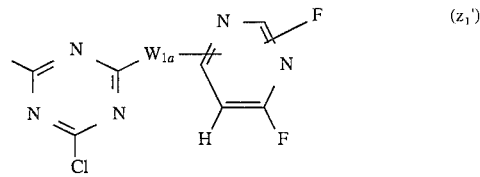

wherein
$W_{1a}$ is

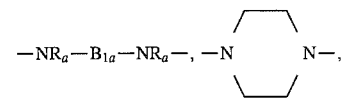

-continued

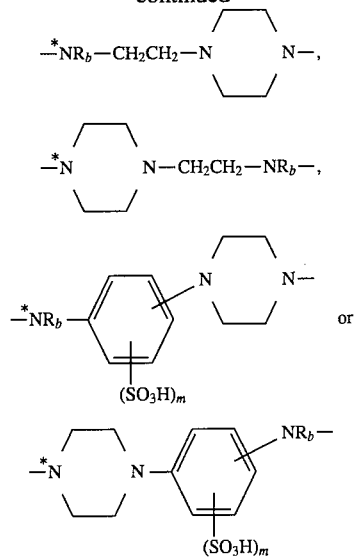

wherein the marked nitrogen atom is bound to a carbon atom of the triazine ring, each $R_a$, $R_b$ and m is defined above, and $B_{1a}$ is $C_{2-3}$alkylene, —$CH_2CH_2$—$NR_a$—$CH_2CH_2$—, or monohydroxy-substituted $C_{3-4}$alkylene.

14. A compound according to claim 13, in which $D_{3a}$ is $D_{3c}$ of the formula

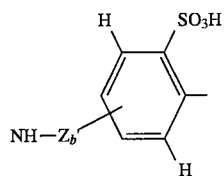

wherein $Z_b'$ is

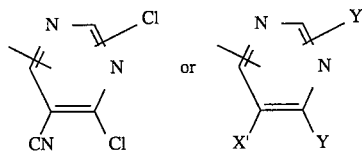

wherein the two Y's are the same and each is fluoro or chloro, and X' is hydrogen or chloro.

15. A compound according to claim 13, in which a is 0 and Z" is ($z_1'''$) of the formula

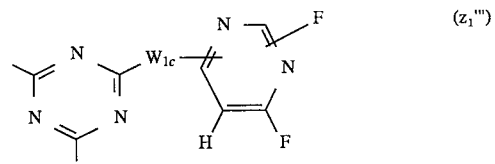

($z_1'''$)

in which $W_{1c}$ is —*NH—$B_{1c}$—$NR_b$—, in which the marked nitrogen atom is bound to a carbon atom of the triazine ring, $B_{1c}$ is —$CH_2CH_2$—, —$CH_2CH_2CH_2$—, —*$CH_2CH(CH_3)$—in which the marked carbon atom is bound to the NH group, or —$CH_2CH(OH)CH_2$—, and $R_b$ is hydrogen or methyl.

16. A process for dyeing or printing a hydroxy group- or nitrogen- containing organic substrate comprising applying to the substrate a compound of claim 1, or a mixture thereof.

17. A process according to claim 16, wherein the substrate is a fibre material comprising natural or regenerated cellulose.

18. A compound of claim 1 of the formulae:

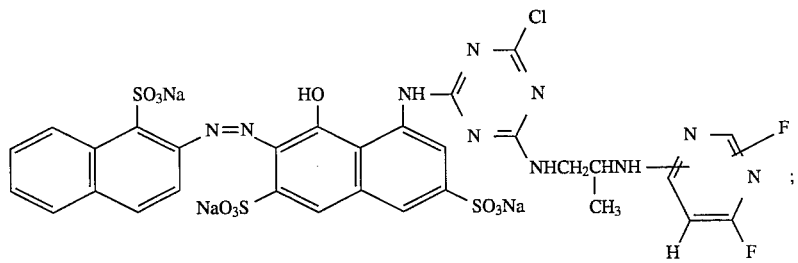

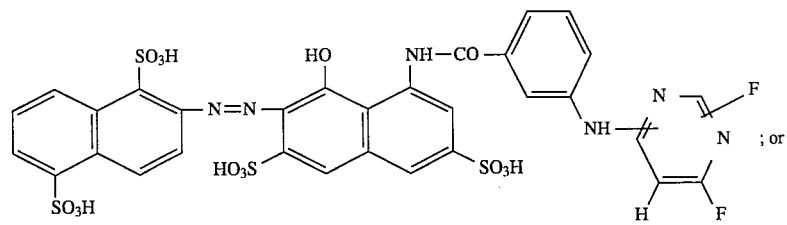

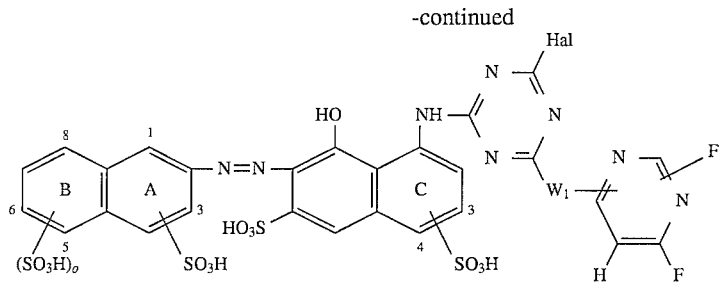
wherein the substituents are as follows:
| p | position of SO₃H in rings A/B | position of SO₃H in ring C | Hal | —W₁— |
|---|---|---|---|---|
| 1 | 1,5 | 3 | Cl | —*NHCH₂CHNH—<br>          \|<br>         CH₃ |
| 0 | 1 | 3 | Cl | —NHCH₂CH₂NH— |
| 0 | 1 | 3 | Cl | —NH(CH₂)₃N—<br>              \|<br>             CH₃ |
* * * * *